United States Patent
Kitou et al.

(10) Patent No.: US 9,545,862 B2
(45) Date of Patent: Jan. 17, 2017

(54) HEADREST MOUNTING STRUCTURE VEHICLE SEAT

(71) Applicant: TOYOTA BOSHOKU KABUSHIKI KAISHA, Aichi-ken (JP)

(72) Inventors: Hidekazu Kitou, Aichi-ken (JP); Akihide Ozaki, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/694,272

(22) Filed: Apr. 23, 2015

(65) Prior Publication Data

US 2015/0306994 A1 Oct. 29, 2015

(30) Foreign Application Priority Data

Apr. 25, 2014 (JP) ................. 2014-091067

(51) Int. Cl.
*B60N 2/48* (2006.01)

(52) U.S. Cl.
CPC ..... *B60N 2/4826* (2013.01); *B60N 2002/4897* (2013.01)

(58) Field of Classification Search
CPC ....... B60N 2/4808; B60N 2/4826; B60N 2/48; B60N 2/4838; B60N 2002/4897
USPC ..................... 297/410, 391, 463.1
See application file for complete search history.

(56) References Cited

U.S. PATENT DOCUMENTS

| 7,370,915 B2 * | 5/2008 | Droche ............... | B60N 2/4817 297/391 |
| 8,991,927 B2 * | 3/2015 | Wisniewski ........ | B60N 2/4808 297/391 |

FOREIGN PATENT DOCUMENTS

JP 2006-198226 8/2006

* cited by examiner

*Primary Examiner* — Milton Nelson, Jr.
(74) *Attorney, Agent, or Firm* — Greenblum & Bernstein, P.L.C.

(57) ABSTRACT

A headrest is mounted to a seat back by inserting a support into a support hole of a holder and inserting a stay of the headrest into to stay hole of the support inserted into the support hole of the holder. A gap occupying part provided in the support moves between an advanced position at which the gap occupying part protrudes from an outer wall of the support and is capable of touching an inner surface of the support hole, and a retracted position at which the gap occupying part is retracted to an inner side of the stay hole from the advanced position. The gap occupying part moves toward the retracted position from the advanced position when the support is inserted into the support hole, and moves toward the advanced position when the stay is inserted into the stay hole.

6 Claims, 11 Drawing Sheets

000# HEADREST MOUNTING STRUCTURE VEHICLE SEAT

INCORPORATION BY REFERENCE

The disclosure of Japanese Patent Application No. 2014-091067 filed on Apr. 25, 2014 including the specification, drawings and abstract is incorporated herein by reference in its entirety.

BACKGROUND OF THE INVENTION

1. Field of the Invention

The invention relates to a headrest mounting structure of a vehicle seat, and particularly relates to a headrest mounting structure of a vehicle seat in which the headrest is mounted to a seat back by inserting a support into a support hole of a holder mounted to the seat back and inserting a stay of the headrest into a stay hole of the support inserted into the support hole.

2. Description of Related Art

Conventionally, a headrest of a vehicle seat is mounted to a seat back by inserting a support into a support hole of a holder mounted to the seat back and inserting a stay of the headrest into a stay hole of the support inserted into the support hole. Herein, Japanese Patent Application Publication No. 2006-198226 (JP 2006-198226 A) describes the support formed with, on its outer surface, a plurality of protrusions that can come into pressure contact with an inner surface of the holder. With this, it is possible to prevent a rattle occurring between the holder and the support when the support is inserted into the support hole of the holder.

However, in the related art described above, the rattle is prevented by the pressure contact of the protrusions with the inner surface of the holder. Accordingly, an insertion force as a force required when the support is inserted into the support hole of the holder is increased. Consequently, there is a possibility that workability of the insertion operation is reduced.

SUMMARY OF THE INVENTION

The invention provides a headrest mounting structure of a vehicle seat capable of preventing a rattle occurring between a holder and a support and suppressing an increase in insertion force required when the support is inserted into a support hole of the holder.

An aspect of the invention relates to a headrest mounting structure of a vehicle seat, including a headrest having a stay, a support having a stay hole, and a holder mounted to a seat back and having a support hole. The headrest is mounted to the seat back by inserting the support into the support hole of the holder and inserting the stay of the headrest into the stay hole of the support inserted into the support hole of the holder. A gap occupying part that moves between an advanced position and a retracted position is provided in the support. The advanced position is a position at which the gap occupying part protrudes from an outer wall of the support and is capable of touching an inner surface of the support hole of the holder, and the retracted position is a position at which the gap occupying part is retracted to an inner side of the stay hole from the advanced position. The gap occupying part moves toward the retracted position from the advanced position with a reaction force from the inner surface of the support hole when the support is inserted into the support hole of the holder, and moves toward the advanced position while being deformed with a pressing force from an outer surface of the stay when the stay of the headrest is inserted into the stay hole of the support inserted into the support hole of the holder.

According to the configuration, when the gap occupying part moves toward the retracted position from the advanced position, a gap is formed between an outer surface of the support and the inner surface of the support hole (an inner surface of the holder). Accordingly, the outer surface of the support and the inner surface of the holder do not interfere with each other strongly. Consequently, it is possible to suppress an increase in insertion force when the support is inserted into the support hole of the holder. Thereafter, as the gap occupying part moves toward the advanced position while being deformed, the gap occupying part that has moved pushes the inner surface of the support hole of the holder. Accordingly, even when the above gap is formed, it is possible to prevent a rattle caused by the gap.

The gap occupying part may be formed integrally with the support so as to return to the advanced position with a restoring force of elastic deformation as the gap occupying part moves toward the retracted position from the advanced position. According to the configuration, even when an operation of inserting the stay of the headrest into the stay hole of the support is performed, it is possible to make the tip of the inserted stay less likely to be caught on the gap occupying part at the retracted position.

A plurality of the gap occupying parts having different height positions may be provided in the support. According to the configuration, it is possible to increase stability of the support to the holder. Consequently, it is possible to increase accuracy in the mounting of the headrest.

The gap occupying parts may be provided at positions that oppose each other in plan view of the support. According to the configuration, it is possible to further increase the stability of the support to the holder. Consequently, it is possible to further increase the accuracy in the mounting of the headrest.

Two of the gap occupying parts may be provided at positions that restricts rearward tilt of the headrest when a load from a head of a seated occupant acts on the headrest.

According to the configuration, in the mounting state of the headrest, a rear outer surface of the support and the inner surface of the support hole (a rear inner surface of the holder) are in contact with each other without any gap therebetween on the side of a base end of the support. Similarly, a front outer surface of the support and the inner surface of the support hole (a front inner surface of the holder) are in contact with each other without any gap therebetween on the side of a tip of the support. Accordingly, for example, even in the case where a large load acts on the headrest from the head of a seated occupant due to a collision from the rear that has occurred in a vehicle, the support becomes less likely to tilt rearward relative to the holder with these two contact areas. Consequently, it is possible to improve capability to support the head of the seated occupant.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinbelow, an embodiment of the invention will be described by using FIGS. 1 to 11. Note that, in the following description, as an example of a "vehicle seat", a "vehicle seat 1" mounted on an automobile (not shown) will be described. In addition, as an example of a "gap occupying part", an "elastic piece 36" will be described. Further, in the following description, up, down, front, rear, left, and right denote up, down, front, rear, left, and right directions described in the above drawings, i.e., up, down, front, rear, left, and right directions when a state in which the vehicle seat 1 is installed to the automobile is used as a reference.

With reference to FIGS. 1 to 5, the schematic configuration of the vehicle seat 1 according to the embodiment of the invention will be described first. Note that, depiction of a pad and a cover is omitted in order to clarify a structure of an internal framework of the vehicle seat 1 in FIGS. 1 and 2. The vehicle seat 1 serves as, e.g., the driver's seat of the automobile, and is constituted mainly by a seat cushion (not shown), a seat back 3, and a headrest 4 (see FIGS. 1 and 2).

The seat back 3 will be described in detail. Note that a conventional seat cushion may be used as the seat cushion, and hence the detailed description thereof will be omitted. In addition, a conventional headrest constituted by a pair of left and right stays 40 and a headrest main body 42 formed of a cushion body fixed to the stays 40 may be used as the headrest 4, and hence the detailed description thereof will be omitted.

The seat back 3 is constituted by a back frame 10, a back pad (not shown) that envelops the back frame 10, and a back cover (not shown) that covers the surface of the back pad. The back frame 10 is formed into a substantially rectangular frame shape with a left side frame 12, a right side frame 14, an upper frame 16, and a lower panel 18.

Figure 5:
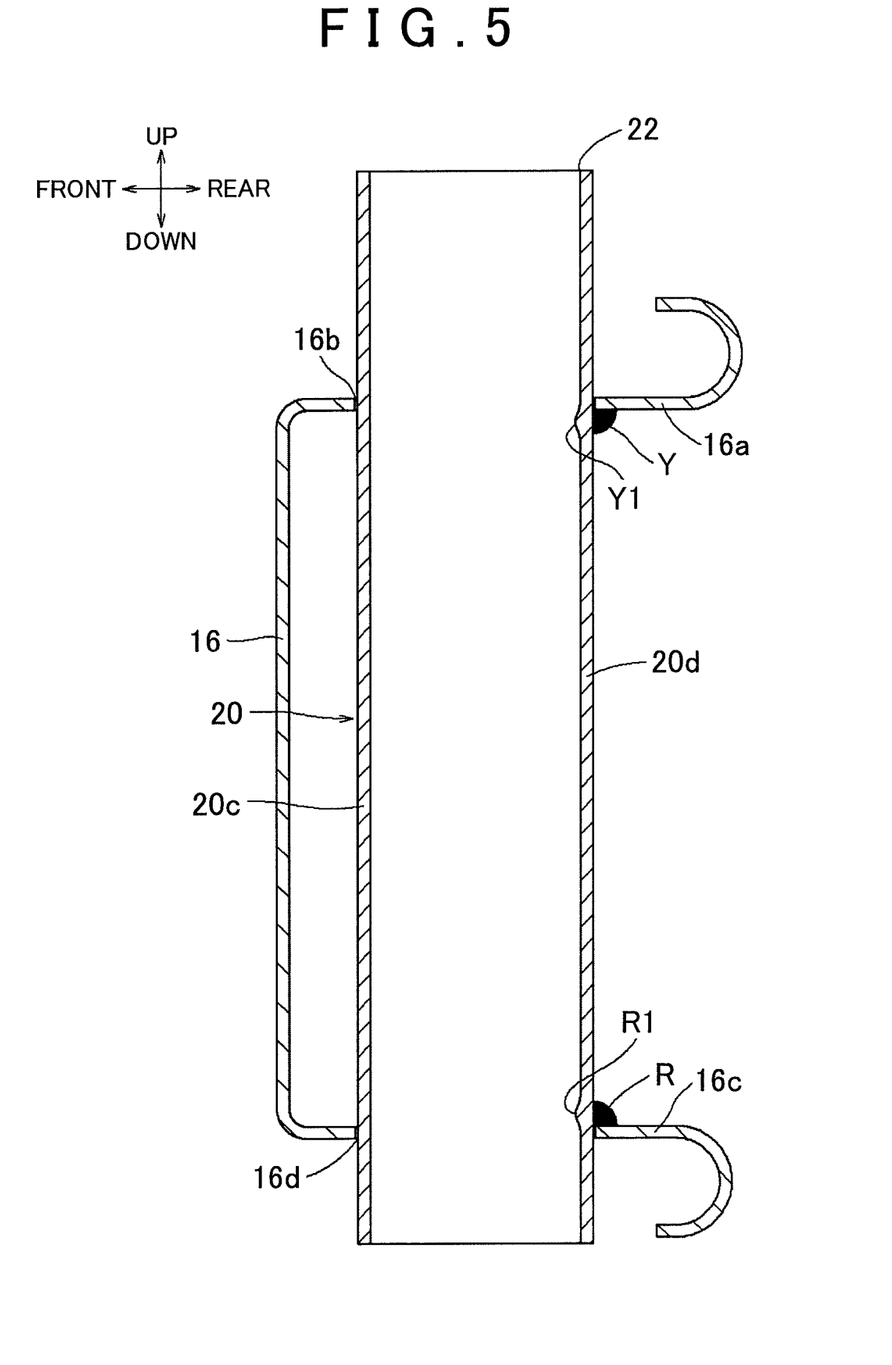
FIG. 5 is a longitudinal sectional view showing the mounting of the headrest of FIG. 2, and shows a state before the support is inserted into a support hole of a holder.

The upper frame 16 is formed into a substantially U shape as viewed from the side (see FIG. 5). Free pieces 16a and 16c are provided in upper and lower parts of the upper frame 16, and through holes 16b and 16d are formed in the free pieces 16a and 16c. A pair of left and right holders 20 are mounted to the upper frame 16 so as to pass through the through holes 16b and 16d. Each of the holders 20 is formed into a square-tube shape by using a metal material so as to have a support hole 22 into which a support 30 described later can be inserted.

Engagement holes (not shown) with which engagement parts 34 of the supports 30 described later can be engaged are formed in left and right walls of the holder 20. Note that mounting of the holder 20 is performed by welding, as shown in FIG. 5. In FIG. 5, black-colored Y and R indicate welding areas. In addition, in FIG. 5, welding parts Y1 and R1 are constituted by portions swollen with the holder 20 melted by the welding.

Figure 3:
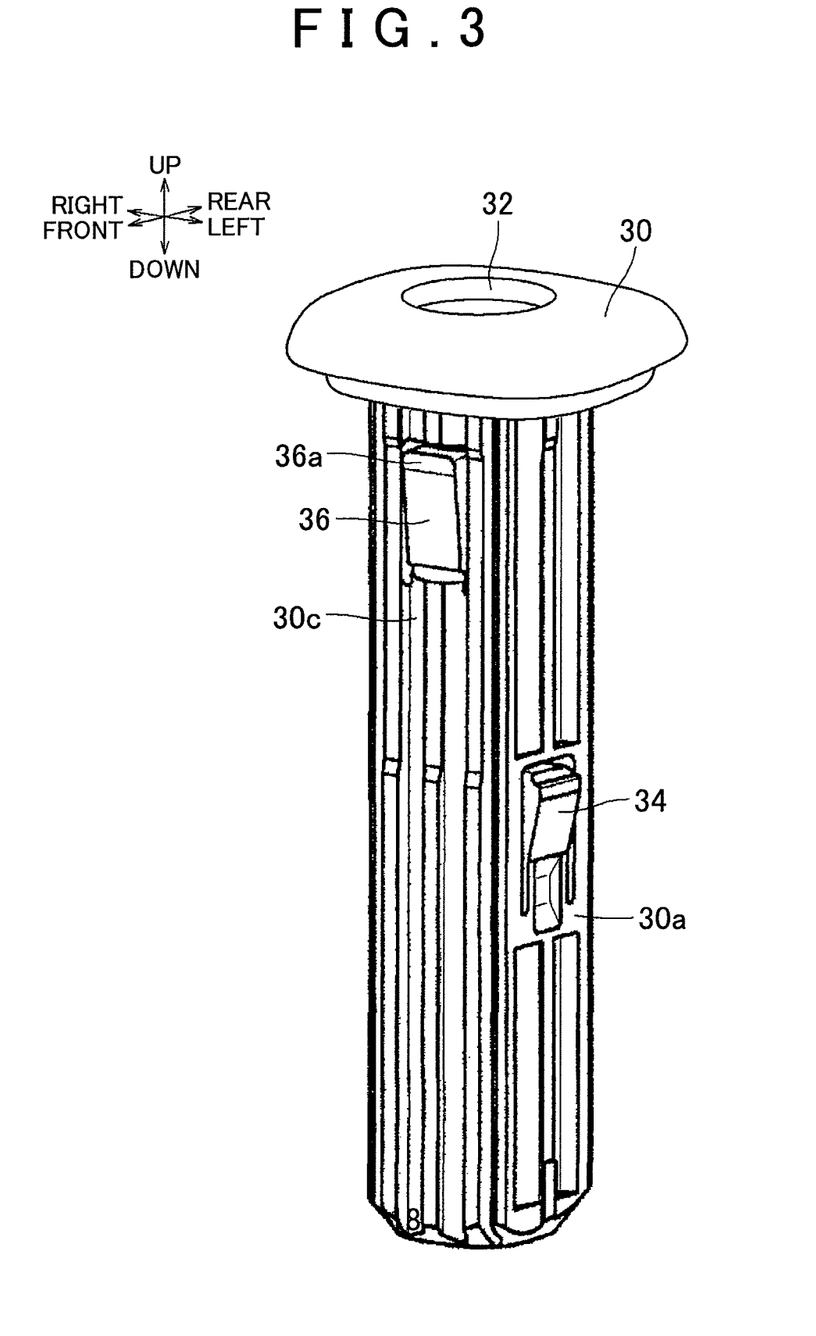
FIG. 3 is an enlarged view of a support of FIG. 2.
Figure 4:
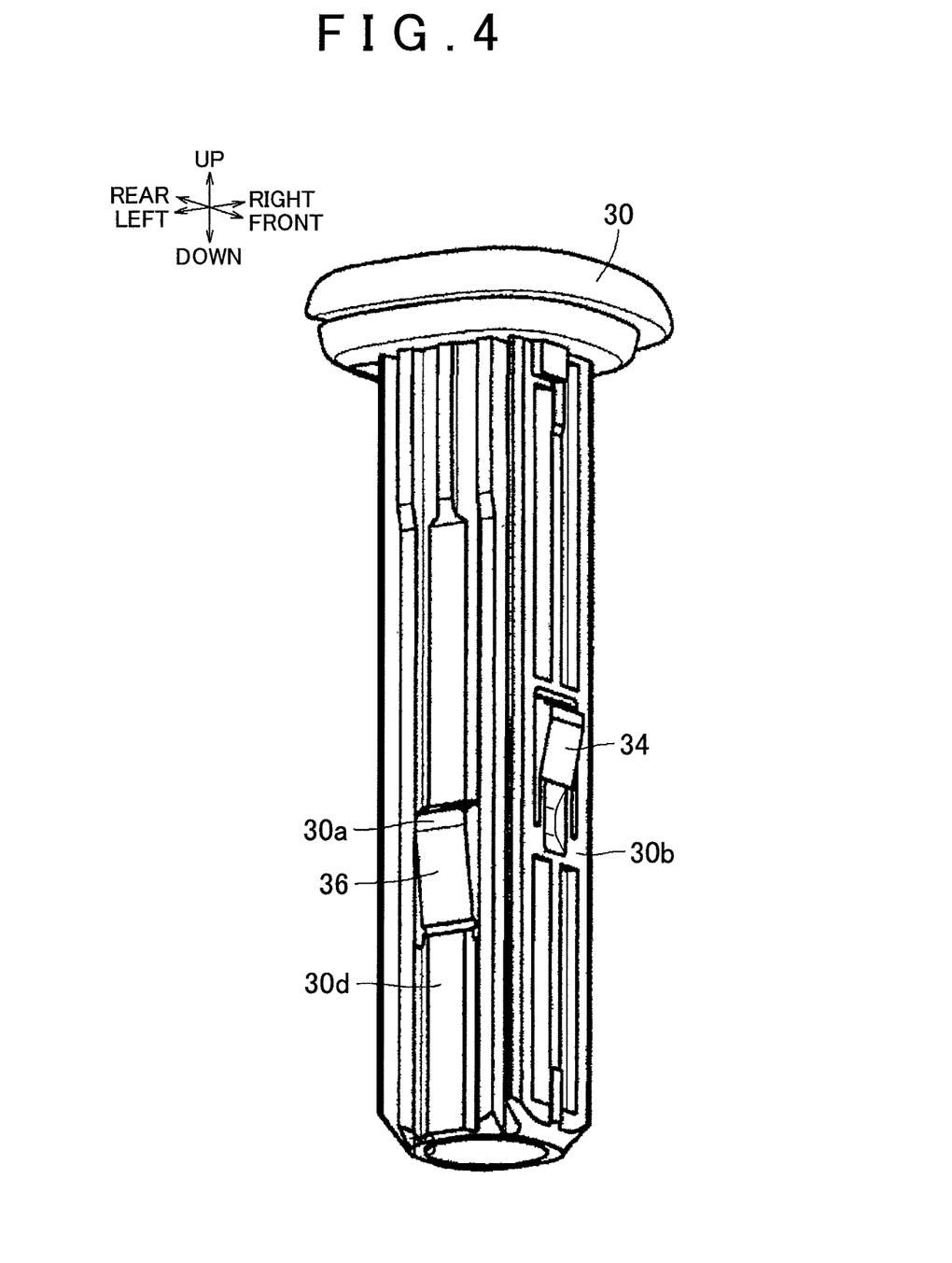
FIG. 4 is a perspective view when the support of FIG. 3 is viewed from a back side.

Herein, with reference to FIGS. 3 and 4, the above support 30 will be described in detail. The support 30 is formed into a substantially square-tube shape as a single piece by using a stiff synthetic resin so as to have a stay hole 32 into which a stay 40 of the headrest 4 described above can be inserted. On each of left and right support walls 30a and 30b of the support 30, the engagement part 34 that can be engaged with the engagement hole of the holder 20 described above is formed.

In addition, on each of front and rear walls 30c and 30d of the support 30, an elastic piece 36 having a protrusion 36a capable of touching an inner surface (an inner surface of each of front and rear walls 20c and 20d of the holder 20) of the support hole 22 of the holder 20 described above is formed. The elastic piece 36 on the front wall 30c is formed at a height position close to the based end of the support 30 (a high position) (see FIG. 3). On the other hand, the elastic piece 36 on the rear wall 30d is formed at a height position close to the tip of the support 30 (a low position) (see FIG. 4).

In the case where the support 30 is formed in this manner, these two elastic pieces 36 are disposed in the support 30 so as to have different heights. That is, in the support, a plurality of gap occupying parts having different heights are provided. In addition, in the case where the support 30 is formed in this manner, these two elastic pieces 36 are disposed at positions that oppose each other (the front and the rear) in plan view of the support 30 (in a cross section in a direction orthogonal to a longitudinal direction of the support 30). That is, the gap occupying parts are disposed at positions that oppose each other in plan view of the support.

In addition, the support 30 is formed in this manner, and the two gap occupying parts are thereby provided at positions that restricts rearward tilt of the headrest when a load from the head of a seated occupant acts on the headrest. Note that, of the two elastic pieces 36, the elastic piece 36 on the front wall 30c has the protrusion 36a that protrudes from the front wall 30c of the support 30, and the elastic piece 36 is formed such that the protrusion 36a can move between an advanced position at which the protrusion 36a is capable of touching the inner surface of the support hole 22 of the holder 20 (the inner surface of the front wall 20c of the holder 20) and a retracted position at which the protrusion 36a is retracted toward the inner side of the stay hole 32 of the support 30 from the advanced position.

The same applies to the elastic piece 36 on the rear wall 30d. Note that both of the elastic pieces 36 are formed integrally with the support 30 as substantially U-shaped portions that are cut out of the front and rear walls 30c and 30d of the support 30. Accordingly, as each of the elastic pieces 36 moves from the advanced position toward the retracted position, a restoring force of deformation that causes the elastic piece 36 to return to the advanced position acts on the elastic piece 36.

Next, with reference to FIG. 2 and FIGS. 5 to 11, an operation of mounting the headrest 4 to the seat back 3 described above will be described. Note that, in the description, the mounting is performed in a symmetrical manner, and hence the mounting on one side will be described and the description of the mounting on the other side will be omitted.

Figure 1:
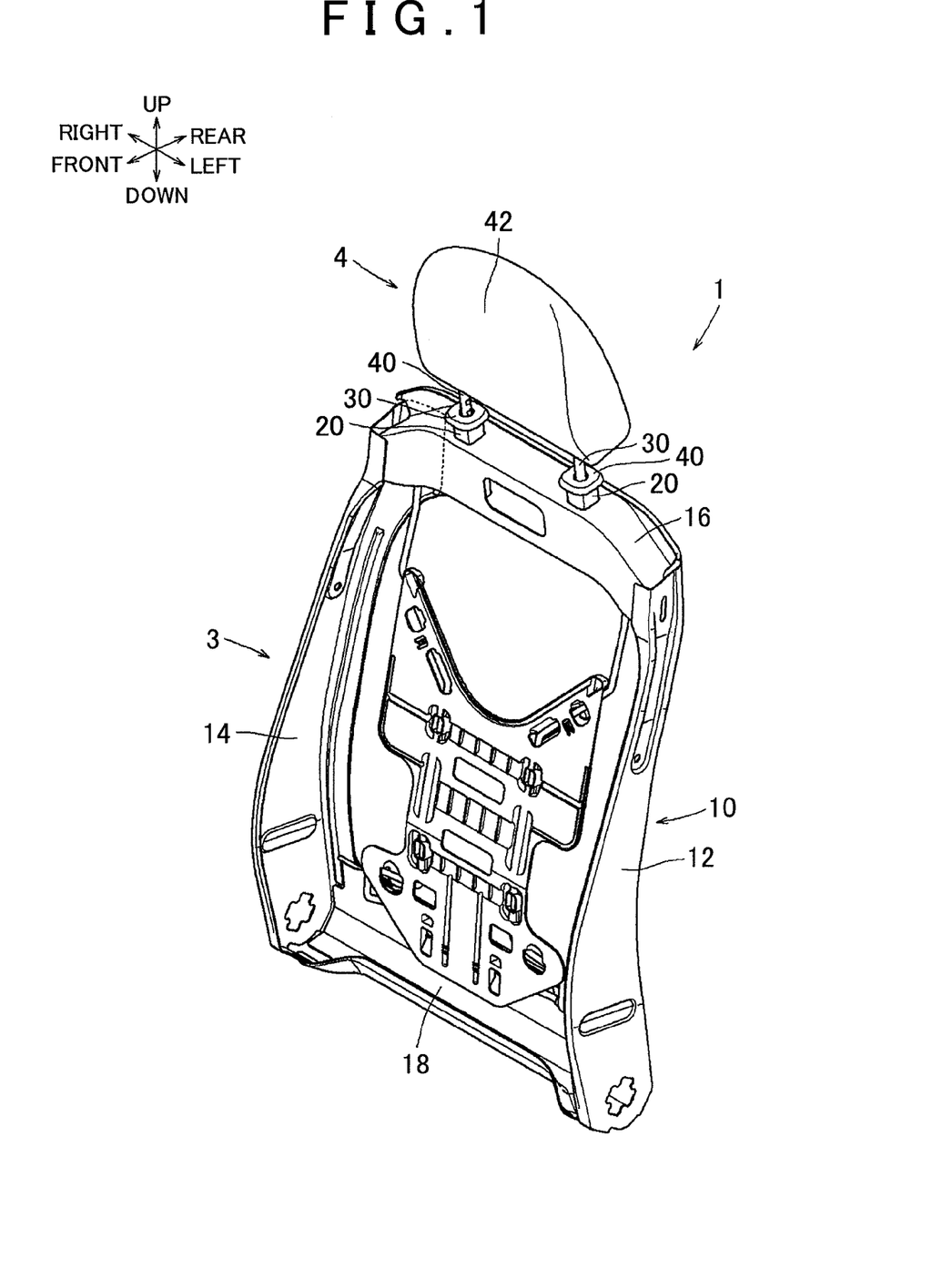
FIG. 1 is a perspective view showing a framework of a vehicle seat according to an embodiment of the invention.
Figure 2:
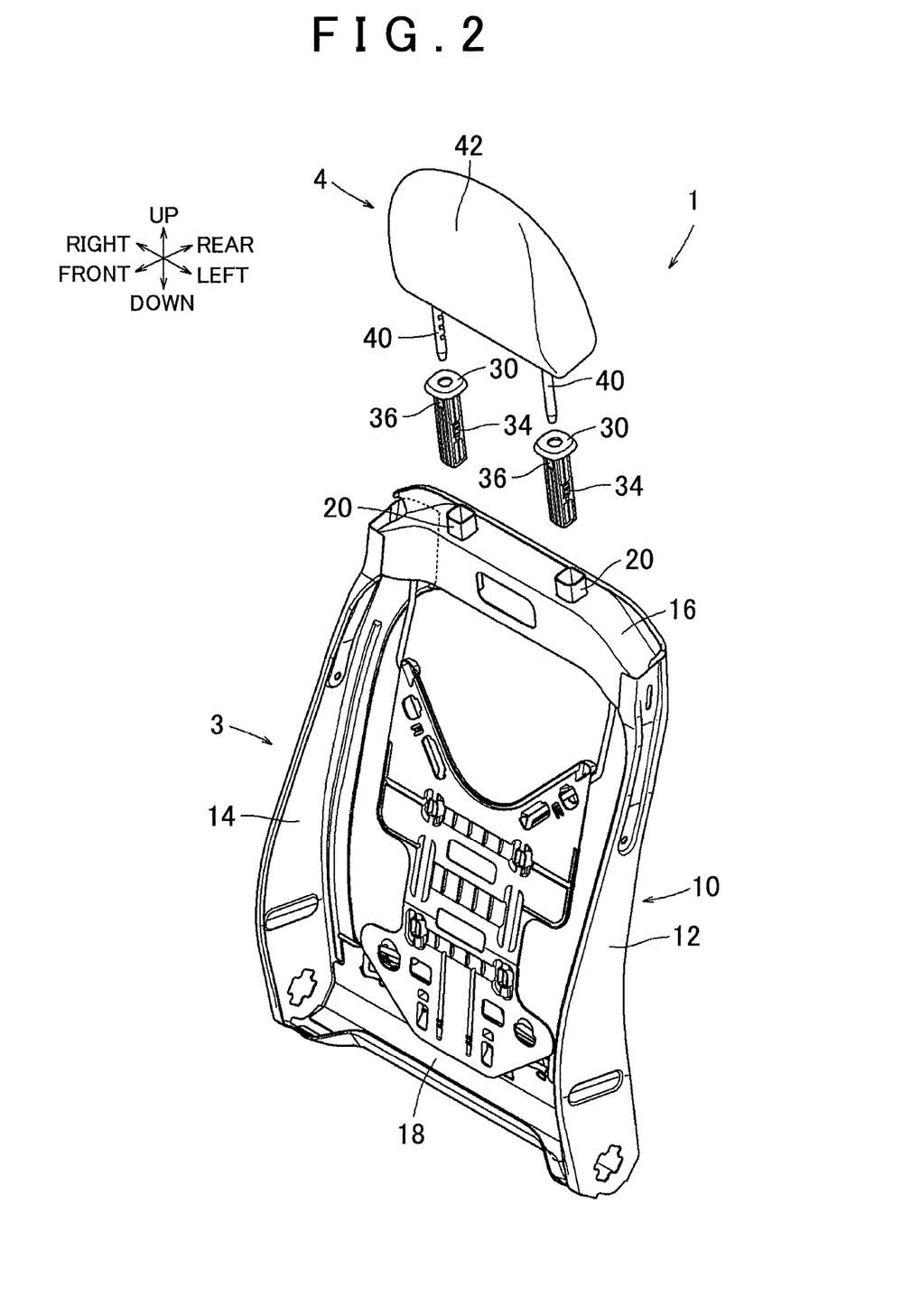
FIG. 2 is an exploded view showing mounting of a headrest of FIG. 1.
Figure 6:
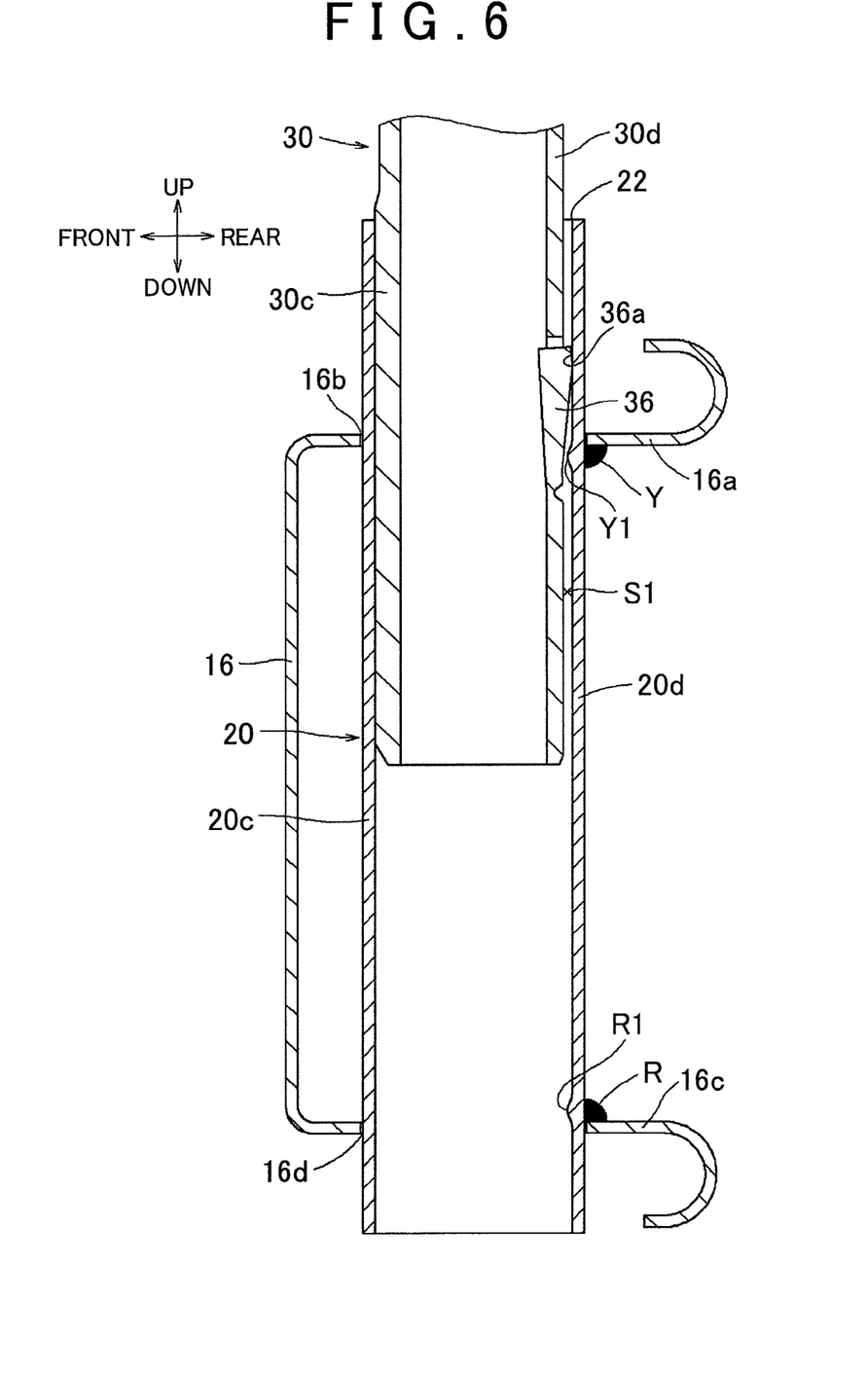
FIG. 6 is a view for explaining a procedure subsequent to FIG. 5.

In states shown in FIGS. 2 and 5, an operation of inserting the support 30 into the support hole 22 of the holder 20 is performed first (see FIG. 6). As a result, the protrusion 36a of the elastic piece 36 on the rear wall 30d of the support 30 is pushed against the inner surface of the support hole 22 (the inner surface of the rear wall 20d of the holder 20). Accordingly, the elastic piece 36 is deformed to move from the advanced position toward the retracted position with a reaction force from the inner surface. At this point, as is apparent from FIG. 6, a gap S1 is formed between the outer surface of the rear wall 30d of the inserted support 30 and the inner surface of the support hole 22 (the inner surface of the rear wall 20d of the holder 20).

Accordingly, the outer surface of the rear wall 30d of the support 30 and the inner surface of the rear wall 20d of the holder 20 do not interfere with each other strongly on the side of the tip of the inserted support 30, and hence it is possible to suppress an increase in insertion force. In addition, when the gap S1 is formed, even in the case where the welding parts Y1 and R1 are formed as described above, it is possible to prevent the welding parts Y1 and R1 from interfering with the rear wall 30d of the support 30.

Figure 7:
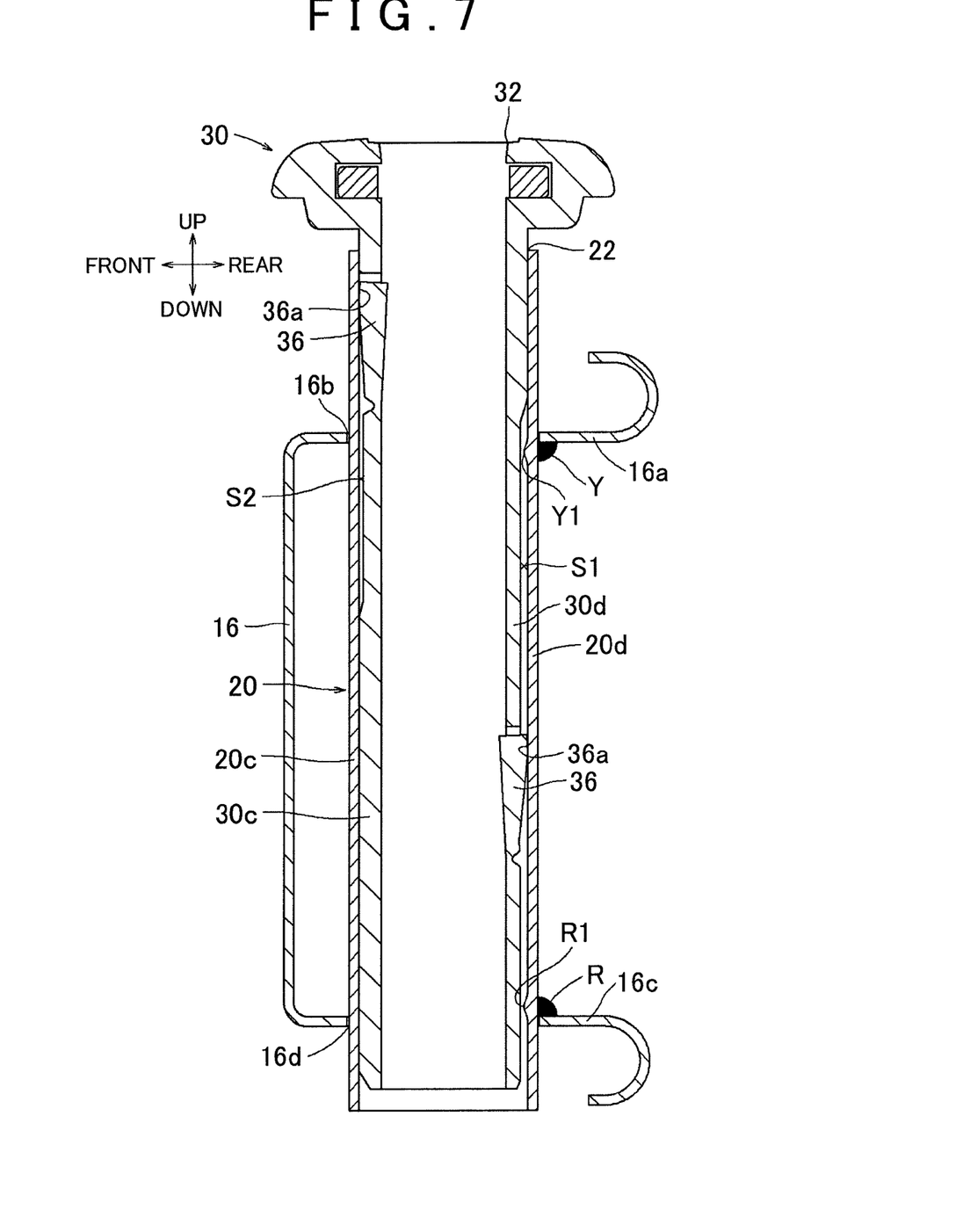
FIG. 7 is a view for explaining a procedure subsequent to FIG. 6.

Next, in the state shown in FIG. 6, an operation of further inserting the support 30 into the support hole 22 of the holder 20 is performed (see FIG. 7). As a result, the protrusion 36a of the elastic piece 36 on the front wall 30c of the support 30 is pushed against the inner surface of the support hole 22 (the inner surface of the front wall 20c of the holder 20). Accordingly, the elastic piece 36 is deformed to move from the advanced position toward the retracted position with the reaction force from the inner surface.

At this point, as is apparent from FIG. 7, a gap S2 is formed between the outer surface of the front wall 30c of the inserted support 30 and the inner surface of the support hole 22 (the inner surface of the front wall 20c of the holder 20). Accordingly, the outer surface of the front wall 30c of the support 30 and the inner surface of the front wall 20c of the holder 20 do not interfere with each other strongly on the side of the base end of the inserted support 30, and hence it is possible to suppress the increase in insertion force.

Figure 8:
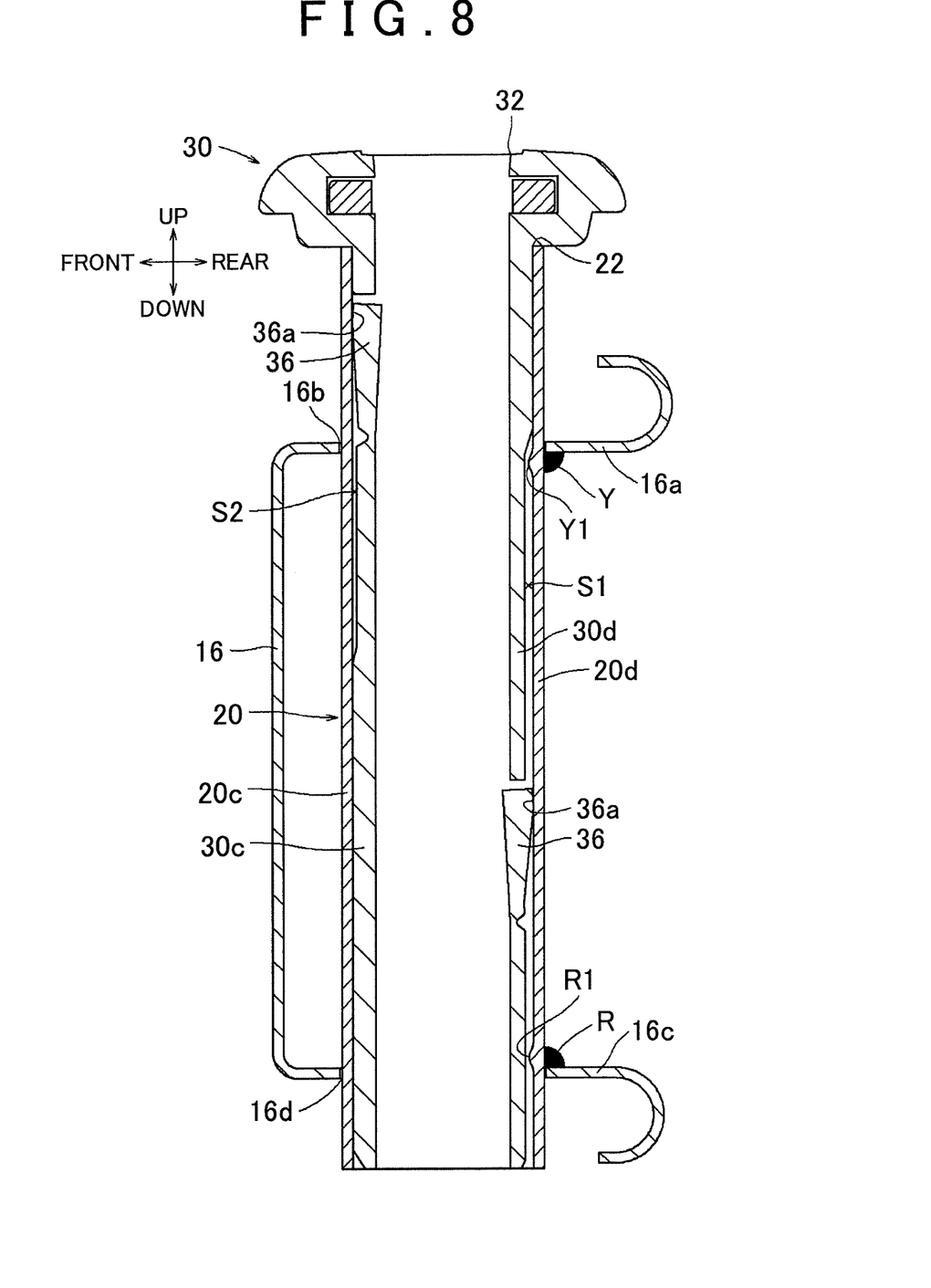
FIG. 8 is a view for explaining a procedure subsequent to FIG. 7.

Next, in the state shown in FIG. 7, an operation of further inserting the support 30 into the support hole 22 of the holder 20 is performed (see FIG. 8). As a result, both of the engagement parts 34 of the support 30 are engaged with the engagement holes of the holder 20 (not shown in FIG. 8). With this, the mounting of the support 30 to the holder 20 is completed.

Figure 9:
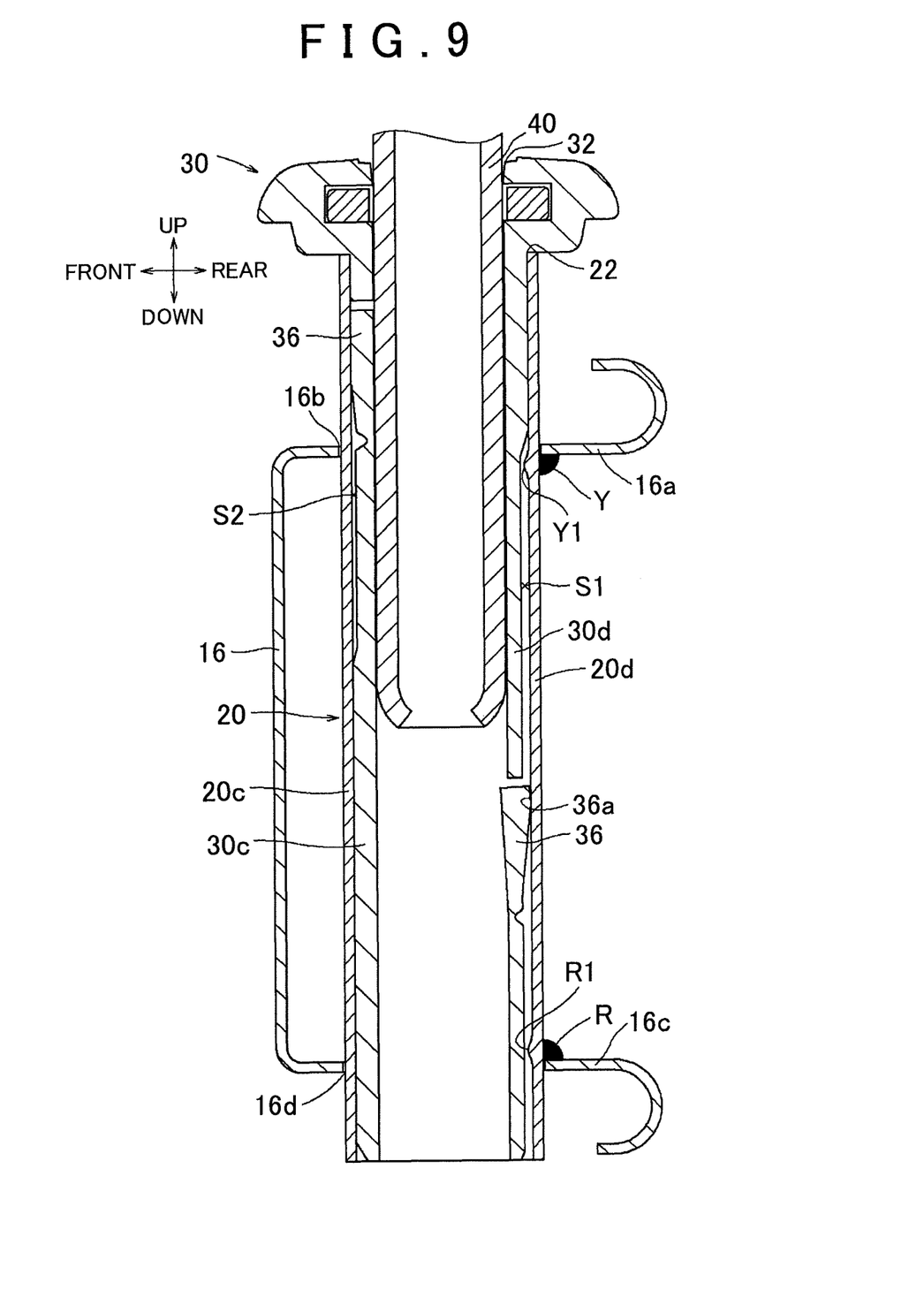
FIG. 9 is a view for explaining a procedure subsequent to FIG. 8.

Next, in the state shown in FIG. 8, an operation of inserting the stay 40 of the headrest 4 into the stay hole 32 of the support 30 is performed (see FIG. 9). As a result, the outer surface of the inserted stay 40 pushes the elastic piece 36 on the front wall 30c of the support 30 at the retracted position outward. As is apparent from FIG. 9, the tip of the stay 40 is tapered. Consequently, it is possible to prevent the tip of the inserted stay 40 from being caught on the elastic piece 36 at the retracted position.

Note that the pushed elastic piece 36 on the front wall 30c moves toward the advanced position while the protrusion 36a is deformed or s by the inner surface of the stay hole 32 (the inner surface of the front wall 20c of the holder 20). Consequently, the pushed elastic piece 36 pushes the inner surface of the support hole 22 of the holder 20 (the inner surface of the front wall 20c of the holder 20), and hence, as described above, even when the gap S2 is formed between the outer surface of the front wall 30c of the support 30 and the inner surface of the support hole 22 (the inner surface of the front wall 20c of the holder 20), it is possible to prevent a rattle occurring between the holder 20 and the support 30.

Figure 10:
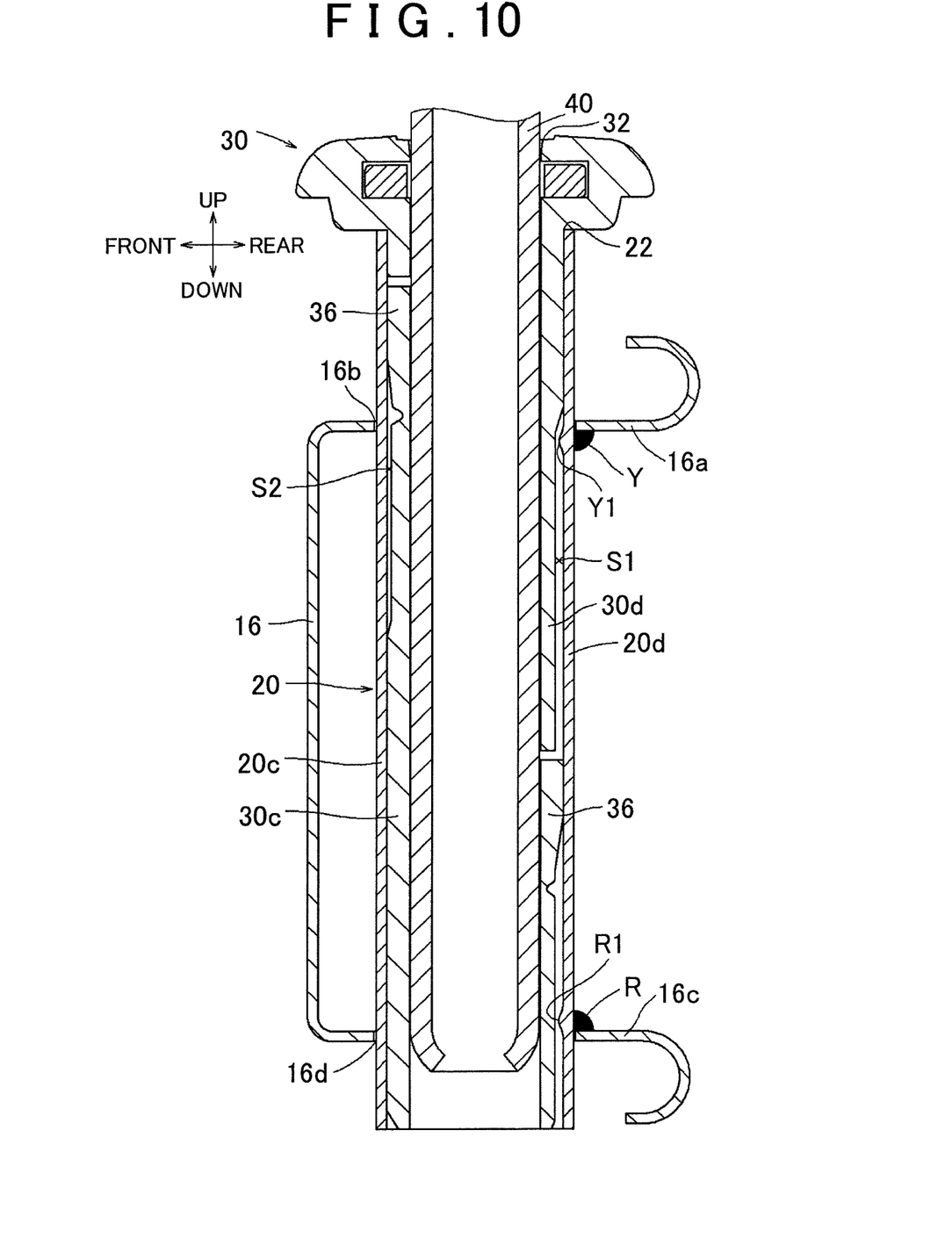
FIG. 10 is a view for explaining a procedure subsequent to FIG. 9.

Next, in the state shown in FIG. 9, an operation of further inserting the stay 40 of the headrest 4 into the stay hole 32 of the support 30 is performed (see FIG. 10). As a result, the outer surface of the inserted stay 40 pushes the elastic piece 36 on the rear wall 30d of the support 30 at the retracted position outward. As is apparent from FIG. 10, the tip of the stay 40 is tapered. Consequently, it is possible to prevent the tip of the inserted stay 40 from being caught on the elastic piece 36 at the retracted position.

Note that the pushed elastic piece 36 on the rear wall 30d moves toward the advanced position while the protrusion 36a is deformed by the inner surface of the stay hole 32 (the inner surface of the rear wall 20d of the holder 20). Consequently, the pushed elastic piece 36 pushes the inner surface of the support hole 22 of the holder 20 (the inner surface of the rear wall 20d of the holder 20), and hence, as described above, even when the gap S1 is formed between the outer surface of the rear wall 30d of the support 30 and the inner surface of the support hole 22 (the inner surface of the rear wall 20d of the holder 20), it is possible to prevent the rattle occurring between the holder 20 and the support 30.

Figure 11:
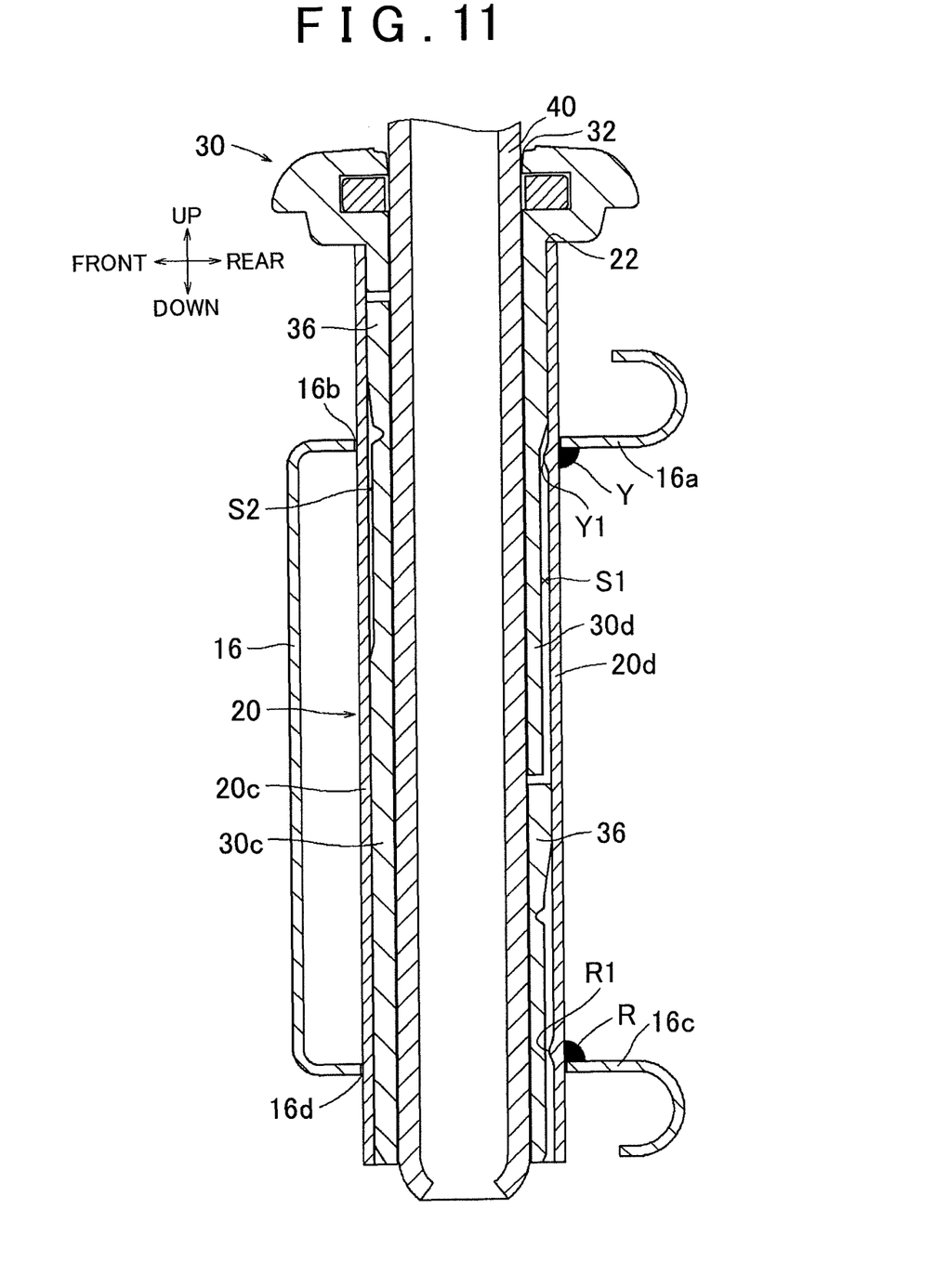
FIG. 11 is a view for explaining a procedure subsequent to FIG. 10.

Finally, in the state shown in FIG. 10, an operation of further inserting the stay 40 of the headrest 4 into the stay hole 32 of the support 30 is performed (see FIG. 11). As a result, a locking part (not shown) of the support 30 is engaged with an engagement part (not shown) of the stay 40. With this, the mounting of the stay 40 of the headrest 4 to the support 30 is completed. Thus, the mounting of the headrest 4 to the seat back 3 is completed. Note that the engagement method of the locking part may be a conventional engagement method, and hence the detailed description thereof will be omitted.

The mounting structure of the headrest 4 according to the embodiment of the invention is configured as described above. According to the configuration, when the operation of inserting the support 30 into the support hole 22 of the holder 20 is performed, the protrusion 36a of the elastic piece 36 on the rear wall 30d of the support 30 is pushed against the inner surface of the support hole 22. Accordingly, the elastic piece 36 is deformed to move from the advanced position toward the retracted position with the reaction force from the inner surface. At this point, as is apparent from FIG. 6, the gap S1 is formed between the outer surface of the rear wall 30d of the inserted support 30 and the inner surface of the support hole 22 (the inner surface of the rear wall 20d of the holder 20). Accordingly, since the outer surface of the rear wall 30d of the support 30 and the inner surface of the rear wall 20d of the holder 20 do not interfere with each other strongly on the side of the tip of the inserted support 30, it is possible to suppress the increase in insertion force. The same applies to the side of the base end of the inserted support 30.

Next, when the operation of inserting the stay 40 of the headrest 4 into the stay hole 32 of the support 30 is performed, the outer surface of the inserted stay 40 pushes the elastic piece 36 on the front wall 30c of the support 30 at the retracted position outward. The pushed elastic piece 36 on the front wall 30c moves toward the advanced position while the protrusion 36a is deformed by the inner surface of the stay hole 32. Consequently, since the pushed elastic piece 36 pushes the inner surface of the support hole 22 of the holder 20, even when the gap S2 is formed between the outer surface of the front wall 30c of the support 30 and the inner surface of the support hole 22 (the inner surface of the front wall 20c of the holder 20), it is possible to prevent the rattle caused by the gap S2. The same applies to the gap S formed between the outer surface of the rear wall 30d of the support 30 and the inner surface of the support hole 22 (the inner surface of the rear wall 20d of the holder 20).

In addition, according to the configuration, the elastic piece 36 is formed such that, when the elastic piece 36 is deformed to moves toward the retracted position, the restoring force of the deformation acts on the deformed elastic piece 36 such that the elastic piece 36 returns to the advanced position. Accordingly, even when the operation of inserting the stay 40 of the headrest 4 into the stay hole 32 of the support 30 is performed, it is possible to make the tip of the inserted stay 40 less likely to be caught on the elastic piece 36 at the retracted position.

Further, according to the configuration, of the elastic pieces 36, the elastic piece 36 on the front wall 30c is formed at the height position close to the base end of the support 30 (the high position). On the other hand, the elastic piece 36 on the rear wall 30d is formed at the height position close to the tip of the support 30 (the low position). With the above formation of the elastic pieces 36, as is apparent from FIG. 11, in the mounting state of the headrest 4, the outer surface of the rear wall 30d of the support 30 and the inner surface of the support hole 22 (the inner surface of the rear wall 20d of the holder 20) are in contact with each other without any gap therebetween on the side of the base end of the support 30. Similarly, the outer surface of the front wall 30c of the support 30 and the inner surface of the support hole 22 (the inner surface of the front wall 20c of the holder 20) are in contact with each other without any gap therebetween on the side of the tip of the support 30. Accordingly, for example, even in the case where a large load acts on the headrest 4 from the head of a seat occupant due to a collision from the rear that has occurred in an automobile, the support 30 becomes less likely to tilt rearward relative to the holder 20 with these two contact areas. Consequently, it is possible to improve capability to support the head of the seated occupant.

The above description is related to one embodiment of the invention, and does not mean that the invention is limited to the above description.

In the embodiment, the "vehicle seat 1 mounted on the automobile" has been described as the example of the "vehicle seat". However, the invention is not limited thereto, and the "vehicle seat" may also be each of seats of various vehicles such as, e.g., a "boat seat", a "plane seat", and a "railway vehicle seat".

In addition, in the embodiment, the "elastic piece" has been described as the example of the "gap occupying part". However, the invention is not limited thereto, and the "gap occupying part" may also be a "holding piece". In this case, the holding piece may be hinge-connected to the support 30 so as to be pivotable about an axis in a direction orthogonal to the axial direction of the support 30, and may be biased to the direction of advancement by a biasing member such as a spring. Further, the "gap occupying part" is not limited to the "holding piece", and the "gap occupying part" may also be a "gap occupying member" formed of a member that is separate from the support 30.

Furthermore, in the embodiment, the configuration in which two elastic pieces 36 are formed has been described. However, the invention is not limited thereto, and the number of elastic pieces 36 may be one, or three or more.

What is claimed is:

1. A headrest mounting structure of a vehicle seat, comprising:
   a headrest having a stay;
   a support having a first outer wall, a second outer wall, a stay hole and a gap occupying part, the stay hole being configured to receive the stay, and the gap occupying part being configured to move between an advanced position and a retracted position; and
   a holder mounted to a seat back and having a support hole, the support hole being configured to receive the support, wherein
   in the advanced position, the gap occupying part protrudes from the first outer wall of the support and is capable of touching an inner surface of the support hole of the holder,
   in the retracted position the gap occupying part is retracted to an inner side of the stay hole from the advanced position,
   when the support is inserted into the support hole of the holder, at least a portion of the second outer wall, which opposes the gap occupying part, is held in contact with the inner surface of the support hole of the holder and the gap occupying part moves toward the retracted position from the advanced position due to a reaction force from the inner surface of the support hole, and
   when the support is inserted into the support hole of the holder and the stay of the headrest is inserted into the stay hole of the support:
      the gap occupying part moves toward the advanced position while being deformed with a pressing force from an outer surface of the stay; and
      the head rest is mounted to the seat back.

2. The headrest mounting structure according to claim 1, wherein the gap occupying part is integral with the support so as to provide a restoring force of elastic deformation that biases the gap occupying part towards the advanced position.

3. The headrest mounting structure of claim 1, wherein when the support is inserted into the support hole of the holder:
   a gap is defined between the first outer wall of the support and the inner surface of the support hole, the gap is provided above and below the gap occupying part in an up-down direction of the headrest mounting structure; and
   a protrusion of the gap occupying part contacts the inner surface of the support hole such that the gap occupying part occupies a portion of the gap, and the inner surface of the support hole applies the reaction force to the protrusion so as to move the gap occupying part from the advanced position to the retracted position.

4. The headrest mounting structure according to claim 1, wherein a plurality of the gap occupying parts having different height positions are provided in the support.

5. The headrest mounting structure according to claim 4, wherein the gap occupying parts are provided at positions that oppose each other in a plan view of the support.

6. The headrest mounting structure according to claim 5, wherein two of the gap occupying parts are provided at positions that restrict rearward tilt of the headrest when a load acts on the headrest.

* * * * *